US00RE36272E

United States Patent [19]

Brokaw et al.

[11] E Patent Number: Re. 36,272

[45] Reissued Date of Patent: Aug. 17, 1999

[54] WAX CRAFT PRODUCT AND METHOD OF MANUFACTURING

[75] Inventors: Paul E. Brokaw, Euclid; Patrick W. Brown, Strongsville; John R. Nottingham, Hunting Valley, all of Ohio

[73] Assignee: The Chenille Kraft Company, Gurnee, Ill.

[21] Appl. No.: 08/553,222

[22] Filed: Nov. 7, 1995

Related U.S. Patent Documents

Reissue of:

[64] Patent No.: 5,374,190
Issued: Dec. 20, 1994
Appl. No.: 08/042,100
Filed: Apr. 1, 1993

[51] Int. Cl.[6] ..... G09B 11/00

[52] U.S. Cl. ..... 434/82; 434/83; 208/20; 208/24; 428/484; 428/393

[58] Field of Search ..... 434/81, 82, 83, 434/96, 97; 428/484, 393; 208/20, 21, 24; 425/381.2; 431/288; 106/230, 231

[56] References Cited

U.S. PATENT DOCUMENTS

| | | | |
|---|---|---|---|
| 77,725 | 5/1868 | Field | 431/288 |
| 1,946,683 | 2/1934 | Gabriel | 434/82 |
| 2,079,550 | 5/1937 | DeMott . | |
| 2,148,632 | 2/1939 | Lovejoy . | |
| 2,888,365 | 5/1959 | Corkum . | |
| 2,914,873 | 12/1959 | Brennan . | |
| 3,044,917 | 7/1962 | Stout et al. . | |
| 3,176,364 | 4/1965 | Dritz . | |
| 3,830,011 | 8/1974 | Ochrymowich . | |
| 3,904,805 | 9/1975 | Johnson et al. . | |
| 4,259,790 | 4/1981 | Borisof . | |
| 4,273,537 | 6/1981 | Borisof . | |
| 4,409,283 | 10/1983 | Boyle, Jr. | 428/484 X |
| 4,446,087 | 5/1984 | Templin | 264/148 |
| 4,490,424 | 12/1984 | Gerace | 428/68 |

FOREIGN PATENT DOCUMENTS

| | | |
|---|---|---|
| 729584 | 3/1966 | Canada . |
| 1226575 | 7/1960 | France . |
| 755543 | 8/1956 | United Kingdom . |

OTHER PUBLICATIONS

Cundy, Martyn, H., "Mathematical Models", Oxford at the Clarendon Press, sections 1.1–1.3.9.

*Primary Examiner*—Jeffrey A. Smith
*Attorney, Agent, or Firm*—Fitch, Even, Tabin & Flannery

[57] ABSTRACT

A wax craft product which comprises a bendable extruded rod of wax having a textured surface is provided. The textured surface enables the rod of wax to adhere to itself and to other surfaces when the rod of wax is pressed into contact with itself and other surfaces. The wax comprises petroleum-derived paraffins, microcrystalline waxes, and hydrocarbon resins. In an alternative embodiment, the wax craft product comprises a bendable extruded rod of wax having a coating which has adhesive properties. In this embodiment, the adhesive coating enables the rod of wax to adhere to itself and to other surfaces when the rod of wax is pressed into contact with itself and other surfaces. As with the textured rod of wax, the wax comprises petroleum-derived paraffins, microcrystalline waxes, and hydrocarbon resins.

28 Claims, 5 Drawing Sheets

WAX CRAFT PRODUCT AND METHOD OF MANUFACTURING

Matter enclosed in heavy brackets [ ] appears in the original patent but forms no part of this reissue specification; matter printed in italics indicates the additions made by reissue.

FIELD OF THE INVENTION

The present invention relates generally to craft products. More particularly, the present invention relates to an elongate craft product solely comprised of wax which may be effectively used to form letters, numerals, figures, objects, and the like.

BACKGROUND OF THE INVENTION

A variety of craft products have been developed over the years for recreational and educational purposes. These craft products have come in unlimited shapes, forms, and materials. One common example is a "pipecleaner." The pipecleaner comprises a piece of flexible wire in which tufted fabric is twisted. The pipecleaner may be used in craft projects and for educational purposes by bending the product to form different shapes and forms.

Further, U.S. Pat. No. 2,148,632 to Lovejoy ("Lovejoy") discloses a flexible strand which may be used to form line drawing pictures of animated objects. The Lovejoy flexible strand may be black or colored thread, string, wire, or chain, or may combination of the above. In Lovejoy, the flexible strand is placed on a background which is covered with a film of oil, glue, or any adhesive material adapted to hold the strand thereon.

In addition, U.S. Pat. No. 4,273,537 to Borisof ("Borisof") discloses a flexible elongate member which may also be used to form letters, figures, and designs. The yarn, wire, or line which is impregnated or coated with a pressure sensitive adhesive material. The adhesive material is a microcrystalline wax with mineral oil in the proportion of 2 to 12% mixed with the microcrystalline wax. In Borisof, the elongate member may be adhered to itself or to paper, cardboard, or any other suitable supporting material.

These prior craft products have several shortcomings. For example, all of the prior craft products are manufactured in specific lengths. Thus, if it is desired to use a length other than the manufactured length, the product must be divided into smaller pieces. However, these craft products are made of materials which do not divide easily and must be cut into smaller pieces using additional tools. The use of such addition tools creates a potential safety concern since children use these craft products and are thus exposed to potentially dangerous tools such as scissors. The wax craft product of the present invention overcomes is problem because it can be easily divided into smaller pieces simply by manually breaking the product or by pulling in opposite directions on the ends.

Furthermore, once the prior craft products are cut into smaller pieces, they cannot be put back together to form the original piece. The wax craft product of the present invention also overcomes this problem because it can be easily rejoined into a single piece by placing two of the ends together and manually exerting finger pressure thereon.

Another shortcoming of prior craft products concerns the ability to adhere to themselves and to other surfaces. In the preferred embodiment of the present invention, the wax craft product comprises a rod of wax having a specifically textured surface. The textured surface results in a greater surface area of the rod of wax coming into contact with other surfaces. The direct consequence of this increased surface area contact is better adhesion with other surfaces.

Additionally, a specific shortcoming of certain of the prior craft products is that they contain oil. As a result, these products feel oily when touched and may leave a residue when they come into contact with other surfaces. The wax craft product of the present invention does not contain oil and thus does mot have these problems.

SUMMARY OF THE INVENTION

Generally, the present invention provides a craft product solely comprised of wax which may be effectively used to form letters, numerals, figures, objects, and the like.

More particularly, the preferred embodiment of the present invention provides a wax craft product which comprises a bendable extruded rod of wax having a textured surface. The textured surface enables the rod of wax to adhere to itself and to other surfaces when the rod of wax is pressed into contact with itself and other surfaces. The wax comprises petroleum-derived paraffins, microcrystalline waxes, and hydrocarbon resins. Further, the wax does not contain any mineral oil.

In an alternative embodiment, the wax craft product comprises a bendable extruded rod of wax having a coating which has adhesive properties. In this embodiment, the adhesive coating enables the rod of wax to adhere to itself and to other surfaces when the rod of wax is pressed into contact with itself and other surfaces. As with the textured rod of wax, the wax comprises petroleum-derived paraffins, microcrystalline waxes, and hydrocarbon resins and does not contain any mineral oil.

These and other features of the present invention are fully described and particularly pointed out in the claims. The following detailed description and accompanying drawings set forth in detail a few illustrative embodiments. However, these embodiments are indicative of but a few of the various ways in which the principles of the present invention may be employed.

DETAILED DESCRIPTION OF THE PREFERRED EMBODIMENT

Figure 1B:
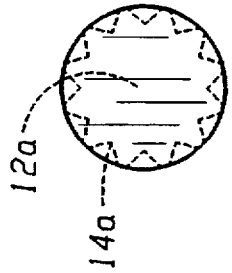
FIGS. 1a–1b and 1c–1d illustrate side views and end views, respectively, of preferred embodiments of a wax craft product constructed according to the principles of the present invention.
Figure 1D:
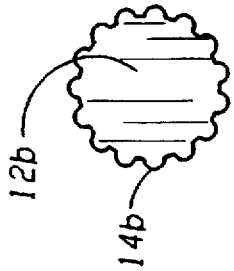
Figure 1A:
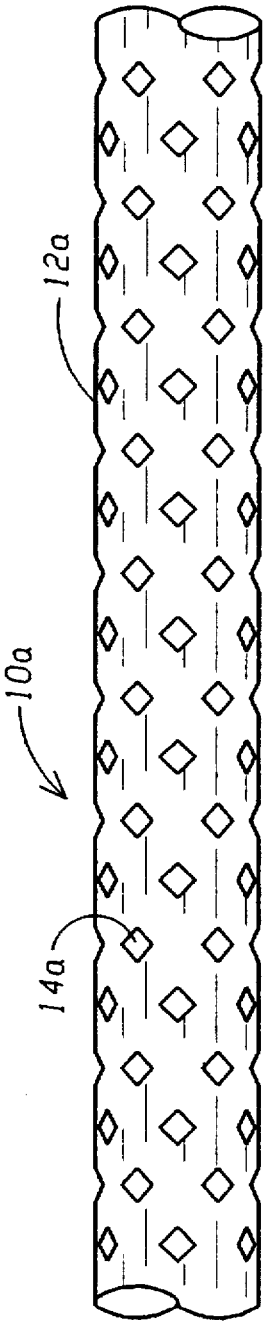
Figure 1C:
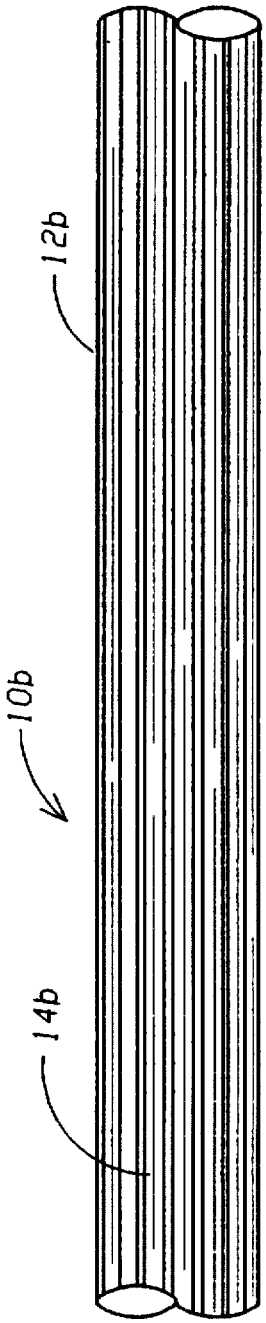
Figure 2:
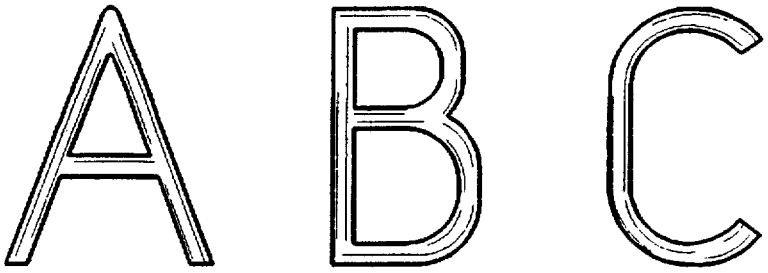
FIG. 2 is a schematic illustration of letters formed using the wax craft products of the present invention.
Figure 3:
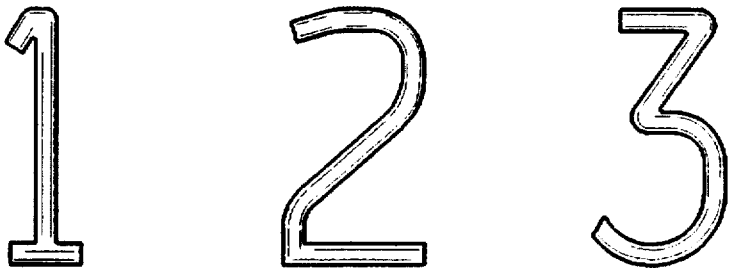
FIG. 3 is a schematic illustration of numerals formed using the wax craft products of the present invention.
Figure 4:
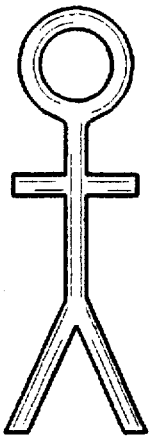
FIG. 4 is a schematic illustration of a figure of a person formed using the wax craft product of the present invention.
Figure 5:
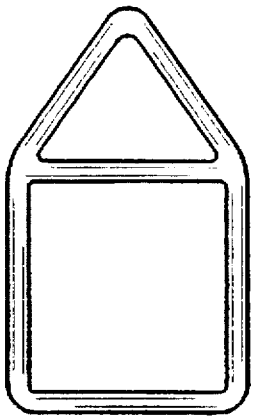
FIG. 5 is a schematic illustration of a house formed using the wax craft product of the present invention.

Referring to the drawings, FIGS. 1a–1b and 1c–1d illustrate side views and end views, respectively, of preferred embodiments of a wax craft product 10a, 10b constructed according to the principles of the present invention. The wax craft product 10a, 10b comprises a bendable extruded rod 12a, 12b of wax having a textured surface 14a, 14b. In FIG. 1a, the textured surface 14a is formed by indentations covering the surface of the product. In FIG. 1b, the textured surface 14b is formed by longitudinal grooves also covering the product surface. The bendable nature of the rod 12a, 12b of wax enables the rod to be used to form a variety of shapes. For example, the rod 12a, 12b may be used to form letters, such as A, B, and C (as shown in FIG. 2), numerals, such as 1, 2, and 3 (as shown an FIG. 3), figures of people and houses (as shown in FIGS. 4 and 5), as well as any other figures an objects which may be desired. Furthermore, the textured surface 14a, 14b of the rod 12a, 12b of wax enables the rod to adhere to itself and to other surfaces when the rod 12a, 12b is pressed into contact with itself and other surfaces. Thus, the rod 12a, 12b can be shaped into my desired form and adhered to paper, paperboard, walls, windows, appliances, and numerous other surfaces.

The rod 12a, 12b of wax comprises petroleum-derived paraffins, microcrystalline waxes, and hydrocarbon resins. Two commercially available waxes which are preferably used to form the wax craft product of the present invention are sold by: (1) Kindt-Collins Co., 12651 Elmwood Avenue, Cleveland, Ohio 44111, as Red Wax Formula #9; and (2) Yates Investment Coating Wax, 1615 W. 15th Street, Chicago, Ill. 60608, as Stock No. 110.

Figure 6:
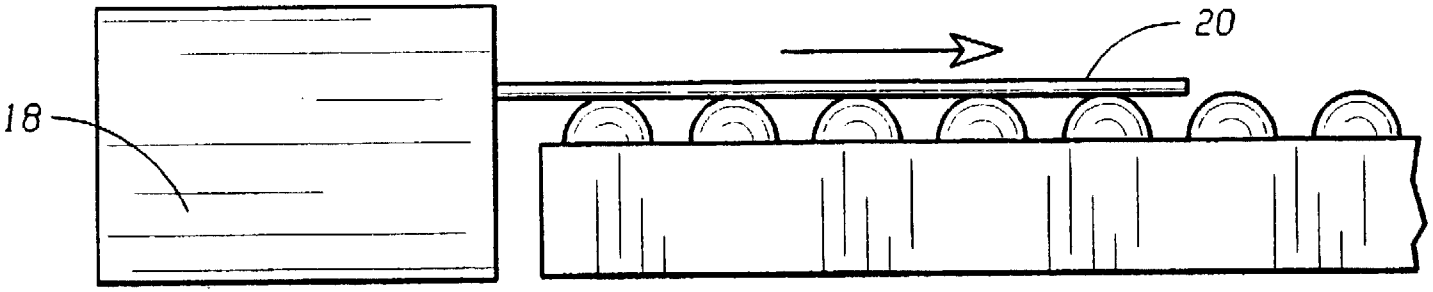
FIG. 6 is a schematic and partial illustration of an extruder which may be used to form the wax craft product of the present invention.

The rod 12a, 12b of wax is preferably formed by a conventional extrusion process which is well known in the art. A schematic illustration of the preferred process used to form the rod 12a, 12b is shown in FIG. 6. While a variety of processes such as injection molding or compression or pressure molding may be used to form the rod 12a, 12b, the extrusion process described is preferred. In the preferred extrusion process, semi-soft wax is supplied to a conventional screw-type extruder 16, which forces the semi-soft wax through a die opening (such as 18a–18c shown in FIGS. 7a–7c) of appropriate shape to produce a continuous rod 20 of wax having a desired surface, such as the type illustrated in FIG. 1b. (The shape of the die opening will be discussed in greater detail below.) The continuous rod 20 of wax which is produced can be cut into a plurality of rods 12a, 12b of wax of any desired length. This cutting step can be performed by a cutting mechanism which operates in conjunction with the extruder, or it can be performed manually.

Figure 7C:
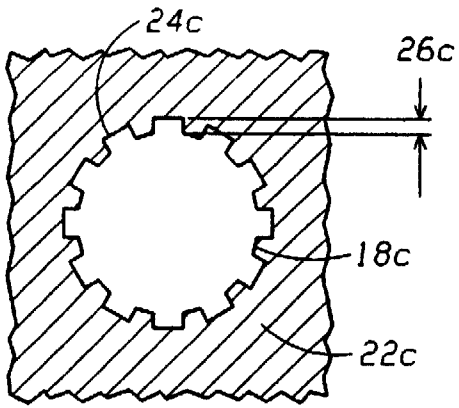
FIGS. 7a, 7b, and 7c are cross-sectional views of three embodiments of a die opening of the extruder of FIG. 6.
Figure 7B:
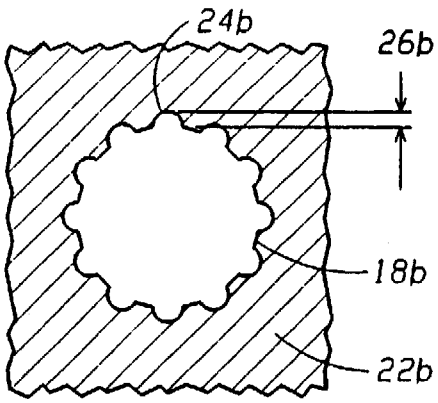
Figure 7A:
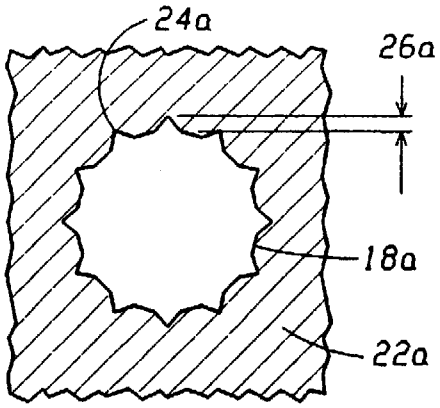
Figure 8:
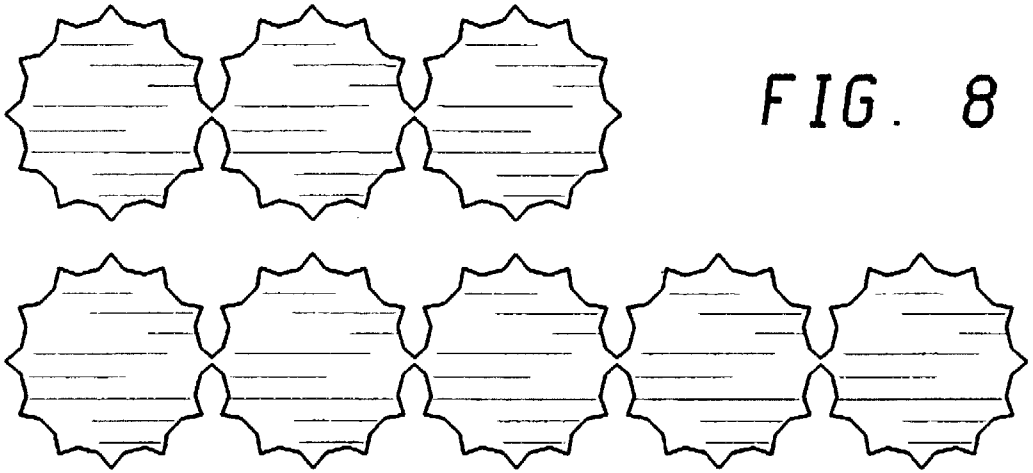
FIG. 8 illustrates two end views of a plurality of wax craft products formed together.

The textured surface 14b of the rod 12b of wax shown in the embodiment of FIG. 1b is formed as the continuous rod 20 of wax is extruded through the die opening 18b of a die 22b (shown in FIG. 7b) secured to the extruder 16. To accomplish this, the cross-sectional shape of the die opening 18b is formed to the desired configuration. The cross-sectional shapes of two other embodiments of die openings 18a and 18c of dies 22a and 22c are shown in FIGS. 7a and 7c. Thus, as the semi-soft wax is forced through the die opening 18a–18c, the surface of the continuous rod 20 of wax is textured based upon the shape of the die opening 18a–18c. FIG. 7b, the die opening 18b is in the shape of grooves 24b. The height 26b of the grooves 24b is preferably between 1/1000 and 40/1000 of an inch. Similarly, die openings 18a and 18c are in the shape of grooves 24a and 24c which have heights 26a and 26c which are preferably between 1/1000 and 40/1000 of an inch. Further, the rods 12b of wax may be formed in a plurality, as illustrated in FIG. 8.

Figure 9:
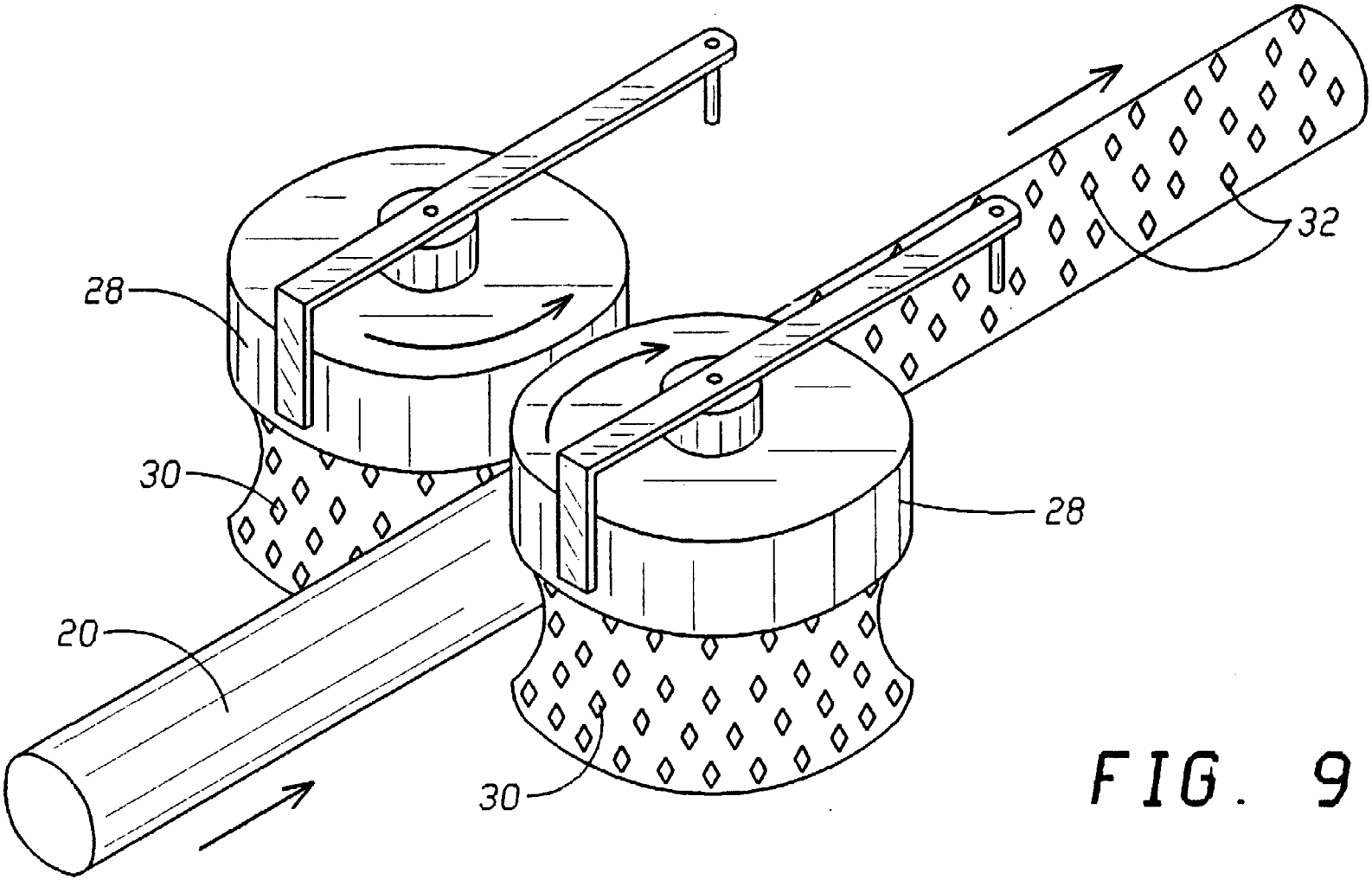
FIG. 9 is a schematic and partial illustration of rollers which may be used to texture the surface of a preferred embodiment of the wax craft product of the present invention.

In the embodiment of FIG. 1a, the textured surface 14a of the rod 12a of wax is formed through a knurling process after the continuous rod 20 of wax has been extruded. Instead of the die openings 18a–18c shown in FIGS. 7a–7c, a circular shaped die opening (not specifically shown) is used to form a continuous rod 20 of wax with a smooth surface. As shown in FIG. 9, the smooth rod 20 is then conveyed through a pair of pulley-like rollers 28. The rollers 28 have a plurality of ridges 30 thereon. Each of the ridges 30 is formed in a particular shape, e.g., a pyramid, a star. As the smooth rod 20 of wax is conveyed through the rollers 24 the ridges 30 form indentations 32 in the appropriate shape in the rod 20 of wax. The indentations 32 collectively form the textured surface 14a.

Figure 10B:
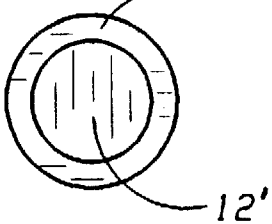
FIGS. 10a and 10b illustrate a cross-sectional side view and an end view, respectively, of an alternative embodiment of a wax craft product constructed according to the principles of the present invention.
Figure 10A:
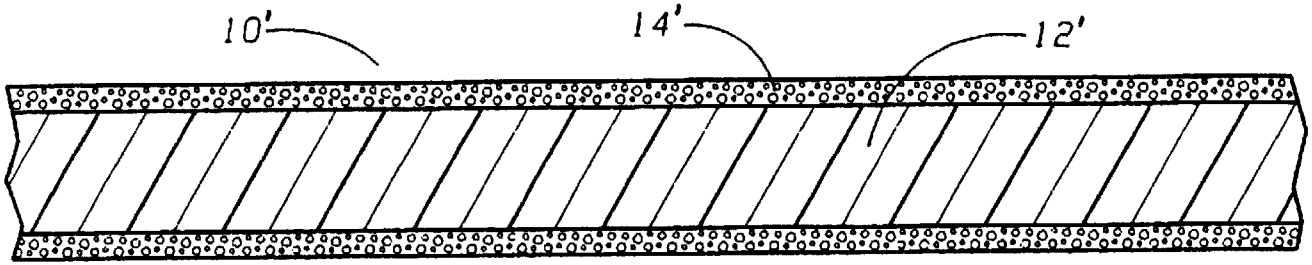

Referring now to FIGS. 10a and 10b, a cross-sectional side view and an end view, respectively, of an alternative embodiment of a wax craft product 10' constructed according to the principles of the present invention are shown. As the embodiments are substantially similar, elements of the alternative embodiment similar to those previously discussed will be referred to with the same reference numbers but with a prime designation. Elements which are different will be referred to with different reference numbers.

The wax craft product 10' comprises a bendable extruded rod 12' of wax having a coating 14' with adhesive properties. As with the rod 12a, 12b of wax, the bendable nature of the rod 12' of wax enables the rod to be used to form a variety of shapes (as shown in FIGS. 2–5). Furthermore, the adhesive coating 14' on the rod 12' of wax enables the rod to adhere to itself and to other surfaces when the rod 12' is pressed into contact with itself and other surfaces. Thus, the rod 12' can be shaped into any desired form and adhered to paper, paperboard, walls, windows, appliances, and numerous other surfaces.

The rod 12' of wax has the same composition as the rod 12a, 12b of wax, i.e., petroleum-derived paraffins, microcrystalline waxes, and hydrocarbon resins. The rod 12' may also be formed through the same extruding process which was discussed above with regard to the rod 12a, 12b. Once formed, the rod 12' of wax is coated with the adhesive coating 14'. The adhesive coating 14' comprises a light, removable or reusable adhesive of the type sold by, for example, Borden, Inc. of Columbus, Ohio as Elmer's® (Fast Tack) Clear Spray Adhesive. The adhesive coating 14' on the rod 12' of wax may be applied through various coating methods. The adhesive coating 14' may be formed by spraying the adhesive onto the rod 12', or by dipping the rod 12' into a reserve of the adhesive.

One may now appreciate that the present invention provides a wax craft product and a method of its manufacture which may be effectively used to form letters, numerals, figures, objects, and the like.

Although the present invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

What is claimed is:

1. A wax craft product, comprising:

a bendable extruded rod of wax having a textured surface;

wherein said wax consists of petroleum-derived paraffins, microcrystalline waxes, and hydrocarbon resins; and wherein said textured surface enables said rod of wax to adhere to itself and to other surfaces when said rod of wax is pressed into contact with itself and other surfaces.

2. The wax craft product as set forth in claim 1, wherein said textured surface comprises a plurality of longitudinal grooves.

3. The wax craft product as set forth in claim 2, wherein the cross-sectional configuration of said rod of wax is formed in the shape of a star.

4. The wax craft product as set forth in claim 2, wherein each groove has a height which is between 1/1000 and 40/1000 of an inch.

5. The wax craft product as set forth in claim 1, wherein said textured surface comprises a plurality of indentations.

6. The wax craft product as set forth in claim 5, wherein each indentation is formed in the shape of a pyramid.

7. The wax craft product as set forth in claim 5, wherein each indentation is formed in the shape of a star.

8. The wax craft product as set forth in claim 5, wherein each indentation has a depth which is between 1/1000 and 40/1000 of an inch.

9. The wax craft product as set forth in claim 1, wherein a plurality of said rods of wax are extruded and provided with said textured surface.

10. The wax craft product as set forth in claim 1, wherein said textured surface is formed through a knurling process after said rod of wax has been extruded.

11. The wax craft product as set forth in claim 1, wherein said wax comprises Kindt-Collins red wax formula #9.

12. A wax craft product, comprising:

a bendable extruded rod of wax having a coating which has adhesive properties;

wherein said wax consists of petroleum-derived paraffins, microcrystalline waxes, and hydrocarbon resins; and wherein said adhesive coating enables said rod of wax to adhere to itself and to other surfaces when said rod of wax is pressed into contact with itself and other surfaces.

13. The wax craft product as set forth in claim 12, wherein said adhesive coating is formed by spraying said rod of wax with an adhesive material.

14. The wax craft product as set forth in claim 12, wherein said adhesive coating is formed by dipping said rod of wax into a reserve of an adhesive material.

15. The wax craft product as set forth in claim 12, wherein said wax comprises Kindt-Collins red wax formula #9.

16. A method of manufacturing a wax craft product, comprising the steps of:

extruding a continuous elongate rod of wax;

knurling the surface of said rod of wax by providing longitudinal grooves therein as said rod of wax is extruded; and cutting said continuous rod of wax into discrete lengths.

17. A wax craft product, comprising:

a bendable extruded rod of wax having a textured surface;

wherein said wax consists essentially of petroleum-derived paraffins, microcrystalline waxes and hydrocarbon resins; and wherein said textured surface enables said rod of wax to adhere to itself and to other surfaces when said rod of wax is pressed into contact with itself and other surfaces.

*18. A wax craft product for use in manually forming letters, numbers, figures, designs and other shaped objects, said wax craft product comprising a rod of wax, said wax being*

*(a) free of mineral oil; and*

*(b) sufficiently malleable so that said rod can be shaped into the form of a complete circle,*

*said rod being capable of being divided into smaller pieces manually, which pieces can be rejoined to form the original rod manually.*

*19. The wax craft product of claim 18, wherein said rod is formed solely of wax.*

*20. The wax craft product of claim 19, wherein said rod has a textured surface enabling said rod of wax to adhere to itself and to other surfaces when said rod of wax is pressed into contact with itself and other surfaces.*

*21. A wax craft product for use in manually forming shaped objects, said wax craft product comprising a plurality of wax rods, said wax rods being arranged in side-by-side relation with adjacent wax rods being connected to each other to form a unitary product, said wax rods being connected to one another in such a way that individual wax rods can be separated from said unitary product and used to form a shaped object, the wax forming said rods being sufficiently malleable so that each of said rods can be shaped into the form of a complete circle.*

*22. The wax craft product of claim 21, wherein each of said rods is capable of being divided into smaller pieces manually, which pieces can be rejoined to form the original rod manually.*

*23. The wax craft product of claim 22, wherein each of said rods is formed solely of wax.*

*24. The wax craft product of claim 22, wherein each of said rods has a textured surface enabling said rods to adhere to themselves and to other surfaces when said rods are pressed into contact with themselves and other surfaces.*

*25. A wax craft product, comprising:*

*a bendable, extruded rod of wax having a textured surface;*

*wherein said wax is sufficiently malleable to allow said rod to be*

*manually formed into a complete circle; and*

*wherein said textured surface enables said rod of wax to adhere to*

*itself and to other surfaces when said rod of wax is pressed into contact with itself and other surfaces.*

*26. The wax craft product of claim 25, wherein said rod of wax is free of oil.*

*27. The wax craft product of claim 25, wherein said rod is capable of being divided into smaller pieces manually, which pieces can be rejoined to form the original rod manually.*

*28. The wax craft product of claim 27, wherein said rod is formed solely of wax.*

* * * * *